United States Patent [19]

Geibel et al.

[11] Patent Number: 5,354,841
[45] Date of Patent: Oct. 11, 1994

[54] PROCESS FOR PREPARING POLY(ARYLENE SULFIDE) POLYMERS USING CYCLIC ARYLENE SULFIDE OLIGOMERS

[75] Inventors: Jon F. Geibel, Bartlesville, Okla.; Carlton E. Ash, Sugarland, Tex.

[73] Assignee: Phillips Petroleum Company, Bartlesville, Okla.

[21] Appl. No.: 103,847

[22] Filed: Aug. 9, 1993

Related U.S. Application Data

[63] Continuation-in-part of Ser. No. 719,852, Jun. 24, 1991, abandoned.

[51] Int. Cl.$^5$ .............................................. C08G 75/02
[52] U.S. Cl. ..................................... 528/388; 525/537
[58] Field of Search ......................... 528/388; 525/537

[56] References Cited

U.S. PATENT DOCUMENTS 3,607,843  9/1971  Vidaurri, Jr. .................. 528/388
4,730,034  3/1988  Nesheiwat et al. ............. 528/388
4,960,861  10/1990  Kotera et al. .................. 528/388

FOREIGN PATENT DOCUMENTS 409105  1/1991  European Pat. Off. .
413257  2/1991  European Pat. Off. .

OTHER PUBLICATIONS

Chemical & Engineering News, Sep. 25, 1989, "New Polymerization Chemistry Expands Thermoplastics Technology".
Plastics News, Sep. 26, 1989, "High Flow Rate of GE Resins Affords Many Opportunities".
High-Tech Materials Alert, vol. 6, No. 11, Nov. 1989.

Primary Examiner—Melvyn I. Marquis
Assistant Examiner—Helen F. Lee
Attorney, Agent, or Firm—Beverly M. Dollar

[57] ABSTRACT

A process is provided for producing a poly(arylene sulfide) polymer which employs as a reactant cyclic arylene sulfide oligomers.

11 Claims, 2 Drawing Sheets

PROCESS FOR PREPARING POLY(ARYLENE SULFIDE) POLYMERS USING CYCLIC ARYLENE SULFIDE OLIGOMERS

CROSS REFERENCE TO RELATED APPLICATIONS

This application is a continuation in part of prior application Ser. No. 07/719,852, filed Jun. 24, 1991, now abandoned, which application is hereby incorporated by reference herein.

FIELD OF THE INVENTION

This invention relates to poly(arylene sulfide), (PAS) polymers. In one aspect this invention relates to a process for the preparation of poly(arylene sulfide) polymers wherein cyclic arylene sulfide oligomers are used as reactants in the polymerization.

In one embodiment of this invention, the cyclic arylene sulfide oligomers are obtained as an undesired by-product of a previous poly(arylene sulfide) polymerization. In another embodiment, the cyclic oligomers are obtained as an undesired product during the purification of a previously prepared poly(arylene sulfide) polymer.

BACKGROUND OF THE INVENTION

Poly(arylene sulfide) polymers are generally known in the art and have been found useful due to their high chemical and thermal resistance. Processes for the preparation of such poly(arylene sulfide) polymers have been disclosed in the art. In a typical preparation, at least one dihaloaromatic compound, a sulfur source, and a polar organic compound are contacted under polymerization conditions. Often certain molecular weight enhancing agents are also added during the polymerization. At the termination of the polymerization, the desirable product is recovered from the spent reaction mixture containing the prior organic compound, unconsumed reactants and by-product inorganic salts and any water which may be present. Some recovery processes for poly(arylene sulfide) polymers additionally separate a portion of the less desirable low molecular weight poly(arylene sulfide) and cyclic and linear oligomers from the more desirable higher molecular weight product. Occasionally, a recovered poly(arylene sulfide) polymer is subjected to a purification process to remove a portion of the lower molecular weight portions, oligomers and other impurities from the more desirable higher molecular weight portions.

The undesired materials must be disposed of in some manner, for example, by placing such material in a landfill or blending such material with other product to render it usable. It would be economically and environmentally desirable to have a process using at least a portion of such undesirable or waste materials so that some of the material need not be disposed of.

OBJECTS OF THE INVENTION

It is an object of this invention to provide a process for preparing a poly(arylene sulfide) polymer which employs cyclic arylene sulfide oligomers.

SUMMARY OF THE INVENTION

In accordance with this invention, poly(arylene sulfide) polymers are prepared by contacting a polymerization reaction mixture comprising at least one dihaloaromatic compound, a sulfur source, and a polar organic compound with cyclic arylene sulfide oligomers under polymerization conditions.

DETAILED DESCRIPTION OF THE INVENTION

Figure 1:
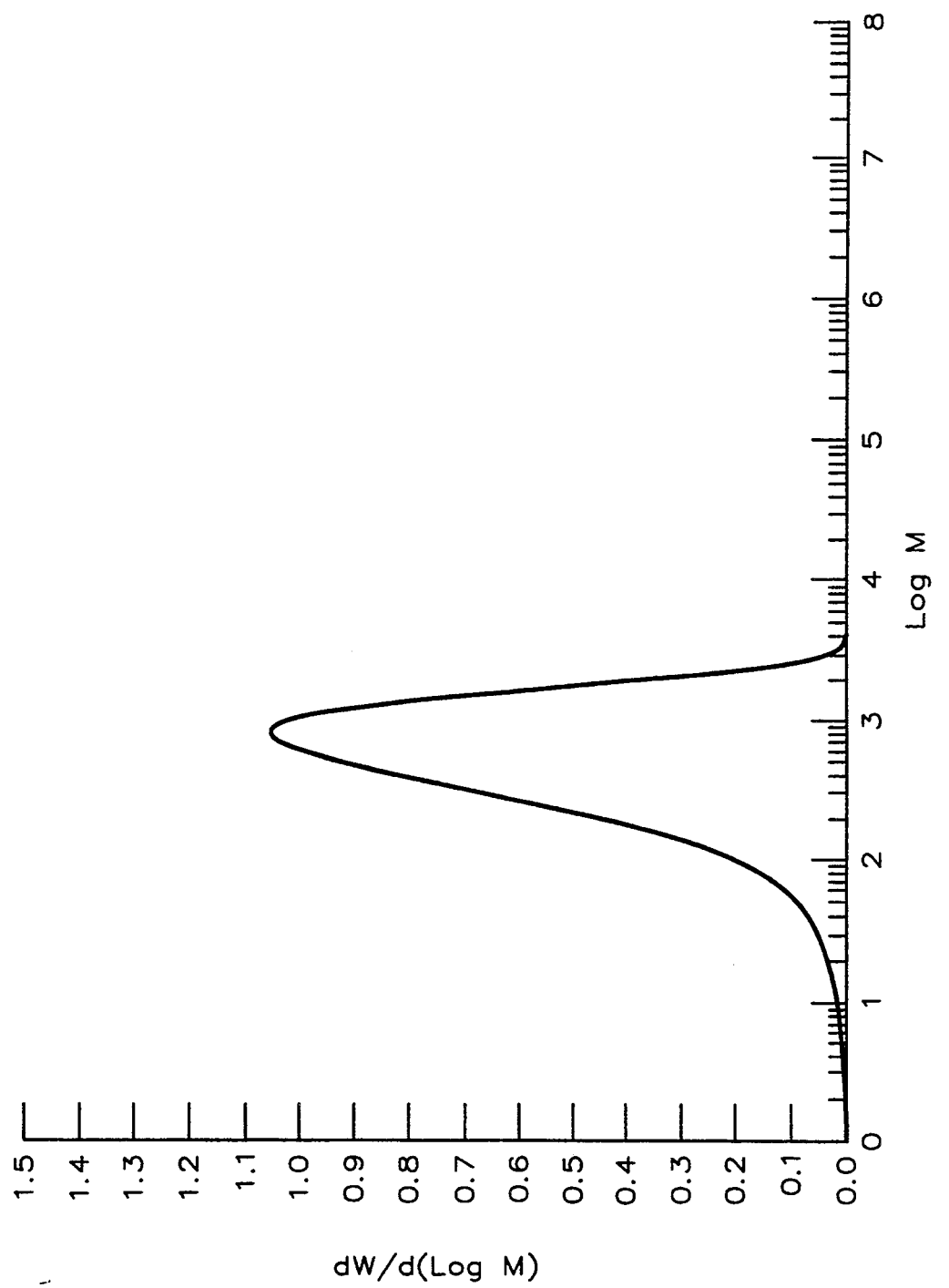
FIG. 1 depicts a molecular weight distribution measured by gel permeation chromatography (GPC) for cyclic arylene sulfide oligomers.

The poly(arylene sulfide) polymer is prepared according to this invention by contacting a polymerization reaction mixture comprising at least one dihaloaromatic compound, a sulfur source, and a polar organic compound with cyclic arylene sulfide oligomers under polymerization conditions.

Dihaloaromatic compounds which can be employed in the process of this invention can be represented by the formula

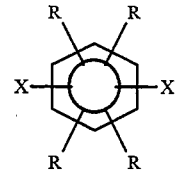

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24. While the halogen atoms can be in any position in the dihaloaromatic compound, it is preferred to employ p-dihalobenzenes as the dihaloaromatic compound.

Examples of suitable p-dihalobenzenes include p-dichlorobenzene (DCB), p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diidobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene and the like, and mixtures of any two or more thereof. The preferred dihaloaromatic compound for use in this invention is p-dichlorobenzene (DCB) due to availability and effectiveness.

Any suitable sulfur source can be employed in the process of this invention. Suitable sulfur sources are disclosed in U.S. Pat. No. 3,919,177, which is hereby incorporated by reference. Such suitable sulfur sources include, but are not limited to thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides and hydrogen sulfide. It is presently preferred to use an alkali metal sulfide as the sulfur source.

Alkali metal sulfides which can be employed in the process of this invention include lithium sulfide, sodium sulfide, potassium sulfide, rubidium sulfide, cesium sulfide, and mixtures thereof. Preferably, the alkali metal sulfide is used as a hydrate or as an aqueous mixture. If desired, the alkali metal sulfide can be prepared as an aqueous solution by the reaction of an alkali metal hydroxide with an alkali metal bisulfide in aqueous solution. If desired, the alkali metal sulfide can be prepared by the reaction of an alkali metal hydroxide and hydrogen sulfide. It is preferred to use sodium sulfide or a combination of sodium bisulfide and sodium hydroxide as the sulfur source in this invention.

The polar organic compounds useful in the present invention are solvents for the dihaloaromatic compounds used in the production of poly(arylene sulfide) polymers. Examples of such polar organic compounds include amides, including lactams, and sulfones. Specific examples of such polar organic compounds include hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N'-dimethylacetamide, 1,3-dimethyl-2-imidazolidinone, low molecular weight polyamides, and the like. The polar organic compound presently preferred is NMP.

It is within the scope of this invention to employ other components in the polymerization reaction mixture or during the polymerization. For example, molecular weight modifying or enhancing agents such as alkali metal carboxylates, lithium halides, or water can be added or produced during polymerization. Suitable alkali metal carboxylates which can be employed include those having the formula $R'CO_2M$ where $R'$ is a hydrocarbyl radical selected from alkyl, cycloalkyl, aryl, alkylaryl, arylalkyl, and the number of carbon atoms in $R'$ is in the range of 1 to about 20, and M is an alkali metal selected from lithium, sodium, potassium, rubidium and cesium. The alkali metal carboxylate can be employed as a hydrate or as a solution or dispersion in water. The preferred alkali metal carboxylate is sodium acetate due to availability and effectiveness.

The cyclic oligomers useful in this invention will generally have the formula

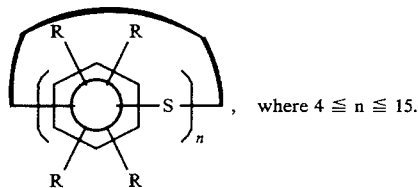, where $4 \leq n \leq 15$.

n, where $4 \leq n \leq 15$.

While higher molecular weight cyclic oligomers can be present, their concentration will not typically be significant.

The cyclic arylene sulfide oligomers can be prepared by any method known to those of ordinary skill in the art. It is presently preferred to employ the cyclic arylene sulfide oligomers prepared in a previous poly(arylene sulfide) polymerization in the invention process.

The cyclic arylene sulfide oligomers obtained from a previous polymerization can also be associated with other components of the spent reaction mixture, such as, for example, linear oligomers, polar organic compound, dihaloaromatic compounds and tri- or tetrahaloaromatic compounds, inorganic salts, poly(arylene sulfide) polymerization by-products, and various contaminants introduced during a poly(arylene sulfide) polymerization or recovery.

The cyclic oligomers and other components from the spent reaction mixture can be used together as reactants or separated and the separate components used as reactants. If desired, the cyclic oligomers can be separated from the linear oligomers and employed as a reactant, or the linear oligomers can be separated and employed as a reactant in a subsequent polymerization.

The separation and recovery of the linear and cyclic oligomers from a polymerization mixture can be achieved, for example, by cooling the polymerization reaction mixture to a temperature at which the polymer solidifies, but above that temperature at which the oligomers solidify, then separating the soluble oligomers from the solidified polymer by filtration, centrifugation, or the like. The filtrate can then be cooled to a point at which the linear oligomers solidify and the solid linear oligomers can be recovered by filtration, centrifugation, or the like. The cyclic oligomers can be recovered from this second filtrate by adding water to the filtrate to form a suspension, then acidifying the suspension to allow easier separation of the cyclic oligomers.

Another method of separating the cyclic oligomers from the other components of the spent reaction mixture is by beginning with the material in a basic medium in which the linear oligomers and certain other components are relatively insoluble, then separating the solid linear oligomers and other insoluble components from the dissolved cyclic oligomers, then contacting the remaining liquid with an acidic medium, causing the solidification of the cyclic oligomers, which can then be recovered by solid-liquid extraction techniques.

Another method of obtaining the cyclic arylene sulfide oligomers is by recovering such oligomers in a process to purify a poly(arylene sulfide) polymer containing such oligomers. For example, a poly(arylene sulfide) polymer containing oligomers can be slurried or dissolved in a suitable solvent, then cooled to, or maintained at a temperature at which the polymer is solid but the oligomers are dissolved. The dissolved oligomers can then be separated from the solid polymer by filtration, centrifugation, or the like.

The poly(arylene sulfide) polymer prepared by the invention method can be either high or low molecular weight polymer. When describing the polymer prepared by the invention method, the term low molecular weight poly(arylene sulfide) polymer is generally meant to denote a poly(arylene sulfide) polymer having a melt flow value in the range of greater than 1000 g/10 min. when measured according to ASTM D 1238, Condition 316/5, modified to use a five minute preheat time.

The term high molecular weight poly(arylene sulfide) polymer, as used herein, is generally meant to denote an essentially linear poly(arylene sulfide) polymer having a melt flow value less than about 1000 g/10 min when in an uncured state. Essentially linear poly(arylene sulfide), as used herein, is defined as a polymer having no branching or such a small amount of branching as to have substantially no effect on the polymer properties. For example, the amount of polyhaloaromatic compound impurity found in the dihaloaromatic compound used in the poly(arylene sulfide) polymerization process would not be sufficient to cause the resultant poly(arylene sulfide) to be outside the essentially linear definition.

As used herein, polyhaloaromatic compound means an aromatic compound having three or more halogen atoms. Exemplary polyhaloaromatic compounds include 1,3,5-trichlorobenzene, 1,2,4,5-tetrachlorobenzene, 1,2,4,5-tetrabromobenzene, and the like.

Generally, the ratio of reactants employed in the polymerization process can vary widely. It is preferred that the molar ratio of the amount of dihaloaromatic compound to amount of sulfur source be in the range of about 0.8/1 to about 2/1. If an alkali metal carboxylate is employed as a molecular weight modifying agent, it is preferred that the molar ratio of alkali weight carboxylate or dihaloaromatic compound be within the range of about 0.05/1 to about 4/1.

The amount of polar organic compound employed can vary during the polymerization over a wide range. Preferably, however during polymerization the molar ratio of the amount of polar organic compound to the range of sulfur source is in the range of 1/1 to 10/1.

The amount of cyclic materials which are used in the polymerization reaction mixture can vary widely. Generally, the upper limit on the amount of cyclic oligomers employed will be imposed by the various limitations of the process vessels such as volume or solids handling limitations.

It is noted that if the cyclic oligomers are used with other components from a previous polymerization reaction, the amount of such components should be limited in combination with the reactants employed in the reaction mixture so that the general guidelines regarding relative amounts of reactants set forth above are followed.

The components of the reaction mixture can be contacted with each other in any order. Generally, the cyclic oligomers can be contacted with the components of the polymerization reaction mixture at any time prior to or during polymerization. If the cyclic oligomers are added with a significant amount of water, it is preferred that the cyclic oligomers and water be contacted with the sulfur source and polar organic compound under conditions sufficient to remove at least a portion of the water prior to addition of the dihaloaromatic compound and commencement of the polymerization; or in the alternative, it is preferred that the cyclic oligomers and water be added at a later point during polymerization so that the addition of the cyclic oligomers and water does not adversely affect the polymerization. If the cyclic oligomers and water are to be added after commencement of the polymerization, it is preferred that at least 40% conversion of the dihaloaromatic compound has taken place prior to the addition of the cyclic oligomers and water.

The cyclic oligomers are preferably contacted with the polymerization reaction mixture during a time sufficiently prior to termination of the polymerization in order to allow reaction of the cyclic oligomers with the other reactants in the polymerization reaction mixture. It is therefore presently preferred to contact the cyclic oligomers with the polymerization reaction mixture at least 30 minutes prior to termination of the polymerization.

The term commencement of the polymerization as used herein is defined as that point at which the polymerization reaction mixture is first subjected to polymerization conditions sufficient to initiate polymerization. The term termination of polymerization, as used herein, is defined as that point at which an affirmative step is taken to effect a removal of the conditions necessary for polymerization to effectively continue, for example, by beginning the recovery of the poly(arylene sulfide) polymer from the polymerization mixture. It must be noted that use of the term termination of the polymerization does not imply that complete reaction of the polymerization reaction components has occurred. Further, the use of the term present reaction mixture is not meant to imply that all reactants have been consumed, only that the reaction mixture has been subjected to polymerization conditions. It should also be noted that, as used herein, the term termination of the polymerization is not meant to imply that no further polymerization of the reactants can take place. Generally, for economic reasons, poly(arylene sulfide) polymer recovery is typically begun at a time when polymerization is substantially completed, that is, the increase in polymer molecular weight which would result from further polymerization is not significant enough to warrant the additional polymerization time.

Although the reaction temperature at which the polymerization is conducted can vary over a wide range, generally it will be within the range of about 170° C. (347° F.) to about 325° C. (617° F.), preferably about 200° C. to about 290° C. The reaction time can vary widely, depending in part on the reaction temperature, but generally will be within the range of about 10 minutes to about 72 hours, preferably about 1 hour to about 8 hours. The pressure should be sufficient to maintain the polar organic compound and the dihaloaromatic compound substantially in the liquid phase.

The poly(arylene sulfide) polymer prepared according to this invention can be recovered by any method known to those of ordinary skill in the art. It is within the scope of this invention to obtain cyclic arylene sulfide oligomers for use in subsequent polymerizations during the recovery of desired poly(arylene sulfide) polymer prepared according to this invention. In this manner, a portion of the waste material resulting from the manufacture of poly(arylene sulfide) polymer can continuously be reused in subsequent polymerizations, avoiding the necessity of disposing of at least a portion of such waste material.

The following examples are provided in order to further illustrate the invention, but are not intended to be limiting of the scope thereof.

EXAMPLES

Poly(phenylene sulfide) (PBS) molecular weight determinations were done on a specially constructed high temperature gel permeation chromatography (GPC) instrument with a flame ionization detector. GPC analyses were carried out at 220° C. in 1-chloronaphthalene. Results are reported in terms of the weight average molecular weight (Mw). Molecular weight values are based on polystyrene standards. For purposes of characterization of molecular weight distribution, the quantity of lower molecular weight material found in the samples have been described herein in terms of the weight percent in the 100 to 10,000 g/mol range.

EXAMPLE I

This example describes the general preparation of a poly(arylene sulfide) polymer, (PPS), according to the method disclosed in U.S. Pat. No. 3,919,177, and the separation of crude polymerization product into a granular, high molecular weight product and a low molecular weight product predominantly consisting of cyclic oligomers. In this typical PPB preparation, a mixture of aqueous sodium bisulfide (NaSH) (6.0 moles), 6.06 moles sodium hydroxide (NaOH), 1450 mL (15 moles) of N-methyl-2-pyrrolidone (NMP), and 1.8 moles sodium acetate (NaOAc) in a stirred reactor were heated and a portion of the water was removed in a dehydration step.

After the dehydration step, 6.06 moles p-dichlorobenzene (DCB) and 580 mL (6 moles) of NMP were added to the dehydrated mixture and the total mixture was heated to polymerization conditions (265° C.) to produce PPS. At the conclusion of the polymerization, the reactor was cooled to produce a mixture of a granular PPS and a finer particle sized material dispersed in a liquid. The product was removed from the reactor rinsing with isopropyl alcohol.

The crude reactor product was mixed with isopropanol and filtered on filter paper. The solids retained on the filter paper comprised granular PPS, fine particulate PPS and inorganic salts. The solids were then washed with hot dionized water. The fine particulate PPS was separated from the granular PPS by decantation. The granule and fine particulate PPS were collected separately and the solid particles were dried at 60° C. in a vacuum oven. The yield of material was 13.66 g.

Three more polymerizations were performed as described above. For each polymerization, the crude filtrate was recovered as described. The solid materials recovered from the crude filtrate for all four polymerizations were combined yielding 49.86 g of material.

This material was purified using a modified Soxlet extraction column containing approximately 2½ inches of activated silica gel, using methylene chloride as the solvent.

The product was further purified in a second extraction using a layer of basic alumina and a layer of acid alumina packed with sea sand. Again, methylene chloride was used as the solvent. The total weight of purified product recovered was 37.6 g.

The purified product was characterized by laser desorption/Fourier transform mass spectrometry using a Nicolet Analytical Instrument FTMS-2000 and a Tachisto $CO_2$ laser operated at 23,000 volts. Background pressure was $<1\times10^{-8}$ torr. The product was found to consist predominantly of cyclic oligomers of the formula

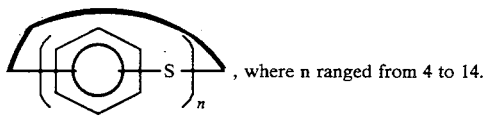, where n ranged from 4 to 14.

where n ranged from 4 to 14.

The product was also analyzed by GPC. The results are depicted in FIG. 1. The product cyclic oligomers appear to contain no components with a molecular weight above about 3500 Daltons.

EXAMPLE II

This examples illustrates the effect of adding cyclic oligomers obtained from a PPS polymerization and recovery to another PPS polymerization. A PPS polymerization run was approximated by charging a 0.1604 g of the cyclic oligomers prepared in Example I, 0.0196 g of p-dichlorobenzene (DCB) 0.0061 g of anhydrous lithium sulfide (obtained from Aldrich Chemical Co.), 0.5085 g NMP and 0.0264 g deionized water to a small glass reactor. The reactor contents were heated with stirring at 265° C.

The reactor was maintained at this temperature for 1 hour, then was allowed to cool to room temperature. The contents of the reactor, (a solid mass), were then removed and washed with 90° C. deionized water to remove water-soluble components of the reaction mixture. The product was dried at 100° C. in a vacuum oven to recover a tan powder. The product was analyzed by GPC. The results are depicted in FIG. 2.

Figure 2:
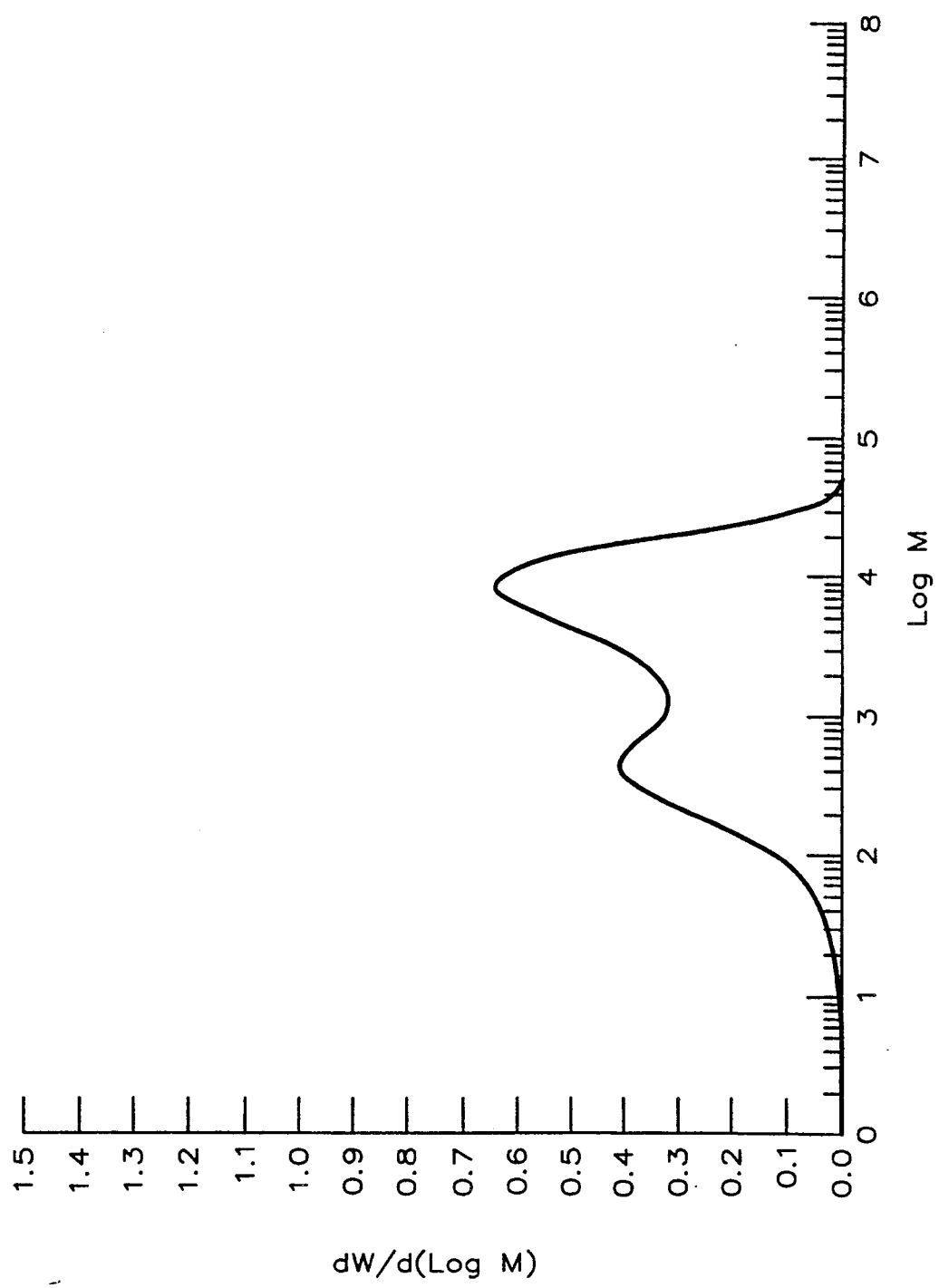
FIG. 2 depicts the GPC molecular weight distribution of a poly(arylene sulfide) polymer prepared using cyclic oligomers as a reactant.

The GPC results depicted in FIG. 2 demonstrate that the product PPS was able to be produced using cyclic oligomers as a reactant. The PPS product contains components with molecular weights as high as 40,000 Daltons. At least 40 weight percent of the product has a molecular weight higher than that of the cyclic oligomers used as a reactant. It is noted that only about 9 weight percent of the product was contributed by the reaction of the DCB with the lithium sulfide, thus the cyclic oligomers were able to be converted to PPS polymer.

While this invention has been described in detail for the purpose of illustration, it is not meant to be limited thereby, but is intended to cover all reasonable modifications within the scope thereof.

That which is claimed is:

1. A process for preparing a poly(arylene sulfide) polymer which comprises:
contacting reactants consisting essentially of at least one dihaloaromatic compound, a sulfur source, a polar organic compound, water and cyclic oligomers of the formula

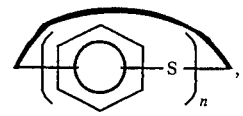

wherein $4 \leq n \leq 15$, under polymerization conditions sufficient to form said poly(arylene sulfide) polymer.

2. A process according to claim 1 wherein said reactants further consist essentially of at least one molecular weight modifying agent selected from the group consisting of alkali metal carboxylates, and lithium halides.

3. A process according to claim 3 wherein said molecular weight modifying agent is an alkali metal carboxylate.

4. A process according to claim 3 wherein said alkali metal carboxylate is sodium acetate.

5. A process according to claim 1 wherein the molar ratio of the amount of said dihaloaromatic compound to said sulfur source is in the range of about 0.8/1 to about 2/1.

6. A process according to claim 1 wherein the molar ratio of the amount of said polar organic compound to said sulfur source is in the range of about 1/1 to about 10/1.

7. A process according to claim 6 wherein said cyclic oligomers and water are contacted with said sulfur source and said polar organic compound under conditions sufficient to remove at least a portion of said water, prior to addition of said dihaloaromatic compound and commencement of said polymerization conditions.

8. A process according to claim 7 wherein said cyclic oligomers and water are contacted with said polymerization mixture after commencement of the polymerization at any point in time after about 40 mole percent conversion of the dihaloaromatic compound.

9. A process according to claim 1 wherein said cyclic oligomers are contacted with said polymerization reaction mixture at any time after commencement of polymerization until termination of said polymerization.

10. A process according to claim 1 wherein said cyclic oligomers are obtained by separating said cyclic oligomers from a desired product in a process to purify a previously prepared poly(arylene sulfide) polymer.

11. A process according to claim 1 wherein said cyclic oligomers are obtained by separating said oligomers from poly(arylene sulfide) polymer during the recovery of said poly(arylene sulfide) polymer.

* * * * *

UNITED STATES PATENT AND TRADEMARK OFFICE
CERTIFICATE OF CORRECTION

PATENT NO.    : 5,354,841

DATED         : October 11, 1994

INVENTOR(S)   : Jon F. Geibel and Carlton E. Ash

It is certified that error appears in the above-identified patent and that said Letters Patent is hereby corrected as shown below:

Col. 8, claim 3, line 1, delete "claim 3" and insert --- claim 2 ---.

Signed and Sealed this

Seventh Day of March, 1995

Attest:

BRUCE LEHMAN

Attesting Officer

Commissioner of Patents and Trademarks